(12) United States Patent  
Tomizawa

(10) Patent No.: US 7,095,745 B2  
(45) Date of Patent: Aug. 22, 2006

(54) COMMUNICATION APPARATUS AND SYSTEM COMPRISING THE SAME

(75) Inventor: Hitoshi Tomizawa, Tokyo (JP)

(73) Assignee: NEC Corporation, Tokyo (JP)

(*) Notice: Subject to any disclaimer, the term of this patent is extended or adjusted under 35 U.S.C. 154(b) by 907 days.

(21) Appl. No.: 09/895,201

(22) Filed: Jul. 2, 2001

(65) Prior Publication Data  
US 2002/0001312 A1    Jan. 3, 2002

(30) Foreign Application Priority Data  
Jun. 30, 2000    (JP)    .............................. 2000-198851

(51) Int. Cl.  
*H04L 12/56*    (2006.01)  
*G06F 15/16*    (2006.01)

(52) U.S. Cl. ...................... 370/397; 370/399; 370/409; 709/247

(58) Field of Classification Search ........ 370/397–399, 370/395.1, 410, 310.2, 396, 400–401, 392; 709/247  
See application file for complete search history.

(56) References Cited

U.S. PATENT DOCUMENTS

| | | | |
|---|---|---|---|
| 5,717,689 A * | 2/1998 | Ayanoglu ................... | 370/349 |
| 5,835,730 A * | 11/1998 | Grossman et al. .......... | 709/247 |
| 6,118,783 A * | 9/2000 | Kunito ........................ | 370/399 |
| 6,249,522 B1 * | 6/2001 | Komine ....................... | 370/399 |
| 6,535,526 B1 * | 3/2003 | Oyamada et al. ........... | 370/477 |

FOREIGN PATENT DOCUMENTS

| | | |
|---|---|---|
| EP | 000537743 A1 * | 4/1993 |
| JP | 5-268241 | 10/1993 |
| JP | 11-88360 | 3/1999 |
| JP | 11-122252 | 4/1999 |
| JP | 11-261572 | 9/1999 |
| JP | 11-289333 | 10/1999 |
| WO | WO 97/33406 | 9/1997 |
| WO | WO 9904522 A * | 1/1999 |
| WO | WO 00/02414 | 1/2000 |

* cited by examiner

*Primary Examiner*—Chi Pham  
*Assistant Examiner*—Tri H. Phan  
(74) *Attorney, Agent, or Firm*—Young & Thompson

(57) ABSTRACT

A communication apparatus is provided which comprises: extraction means for extracting a virtual path identifier and a virtual channel identifier stored in a first header of first cells output from a terminal; preparation means which, based on the extracted virtual path identifier and virtual channel identifier, refers to a conversion table to prepare a second header containing a corresponding identifier; cell generation means for generating second cells containing the prepared second header and the user information of the first cells; multiplexing/generation means for multiplexing the generated second cells so as to have a fixed length, thereby generating third cells; and send means for sending the generated third cells to other communication apparatus through a virtual channel. By virtue of this construction, the usage charge of communication lines, such as ATM lines, can be reduced.

5 Claims, 6 Drawing Sheets

50, 60, 70 2ND CELL
51, 61, 71 2ND HEADER
53, 63, 73 USER INFORMATION
80, 90, 100 3RD CELL
81, 91, 101 3RD HEADER
ID IDENTIFIER
PT/CLP PAYLOAD TYPE/CELL LOSS PRIORITY

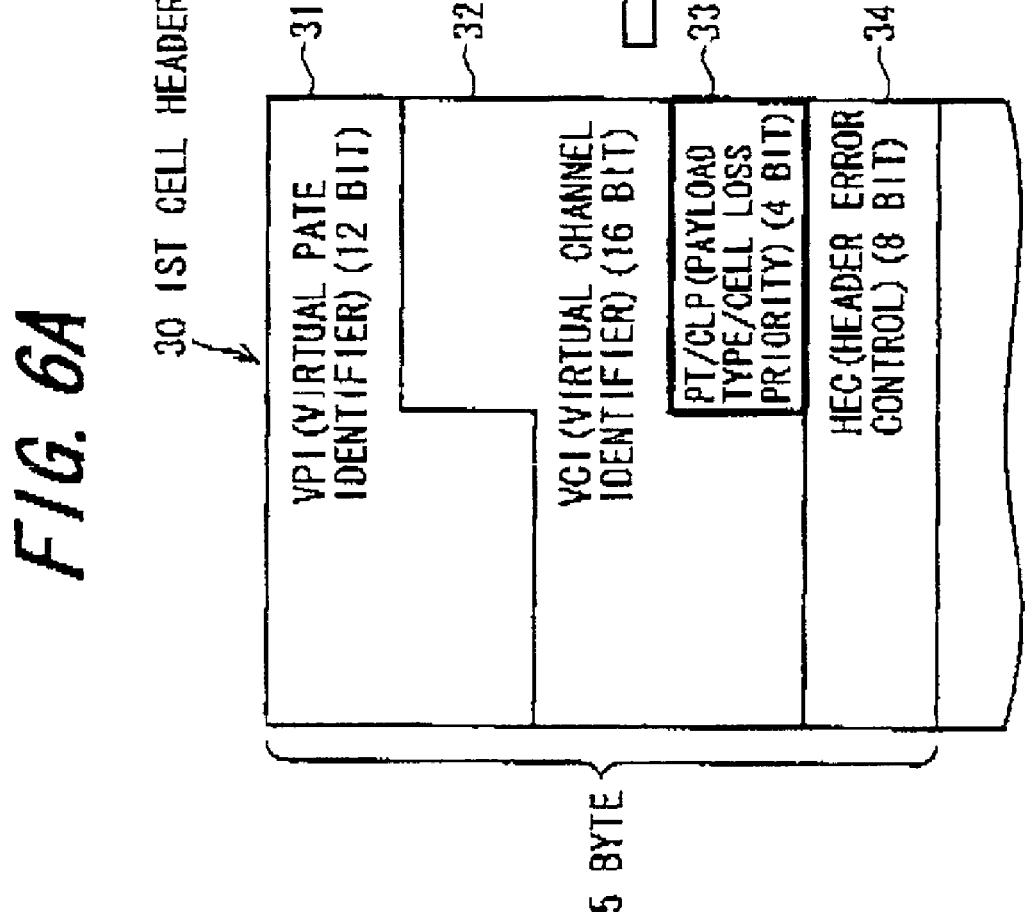

COMMUNICATION APPARATUS AND SYSTEM COMPRISING THE SAME

FIELD OF THE INVENTION

The invention relates to a communication apparatus and a system comprising the same, and more particularly to a communication apparatus for communication using asynchronous transfer mode cells (ATM cells) and a system comprising the same.

BACKGROUND OF THE INVENTION

Regarding data transmission, there is a conventional ATM method wherein all data to be sent are divided into 53-byte ATM cell units which are then sent/received at high speed. Specifically, data to be sent (user information) is stored in the payload of the exchange unit in the ATM cell, and destination information and the like on the send destination of data are stored in the header of the ATM cells, followed by transmission using preset ATM connection to perform data communication.

In this case, for example, a virtual path identifier/virtual channel identifier (VPI/VCI) is used as the destination information, and, according to these identifiers, the ATM cells are transmitted through a predetermined ATM line within an ATM network.

FIG. 1 is a conceptual diagram showing the construction of a conventional ATM cell communication system. As shown in FIG. 1, the conventional ATM cell communication system comprises: a plurality of terminals, such as personal computers; ATM communication apparatuses 1, 3 provided respectively with adaptors 4, 5 for ATM cells (hereinafter referred to as "cells") multiplexing or demultiplexing; ATM exchanges 6, 7 for performing switching between the plurality of terminals and the ATM communication apparatuses 1, 3; and an ATM network 2 composed of a virtual path for connecting the ATM communication apparatuses 1, 3 to each other.

For example, as soon as cells are output from any terminal connected to the ATM exchange 6, the cells are input through the ATM exchange 6 into the ATM communication apparatus 1. In the ATM communication apparatus 1, the received cells are multiplexed in the adaptor 4, followed by send to the ATM communication apparatus 3 side through the ATM network 2 composed of a virtual path. In the ATM communication apparatus 3, the received multiplexed cells are separated, and the separated cells are input into the ATM exchange 7. The ATM exchange 7 sends the received cells to the send destination terminal.

Here the virtual path is a path between end points, which enable a large quantity of simultaneous connections, and a plurality of virtual channels are defined in the virtual path. In this connection, it should be noted that, for communication entrepreneurs for providing ATM lines, it is common practice to set an accounting system which depends upon the number of virtual channels. This means that the usage charge for the ATM line increases with increasing the number of contract virtual channels.

Accordingly, in order to reduce the usage charge for the ATM lines, the contract virtual channel has been changed to a virtual channel having a higher data transfer rate, and a plurality of virtual channels are multiplexed in the virtual path to reduce the number of contract virtual channels.

In order to reduce the number of contract virtual channels through multiplexing of a plurality of virtual channels within the virtual path, however, processing for the change is necessary on the ATM cell communication apparatus side, and this process requires the cost of equipment. That is, the conventional method cannot reduce the usage charge for the ATM lines,

SUMMARY OF THE INVENTION

Accordingly, it is an object of the invention to provide a technique for reducing the usage charge for communication lines such as ATM lines.

In order to attain the above object, according to the first feature of the invention, a communication apparatus comprises:

extraction means for extracting a virtual path identifier and a virtual channel identifier stored in a first header of first cells output from a terminal;

preparation means which, based on the extracted virtual path identifier and virtual channel identifier, refers to a conversion table to prepare a second header containing a corresponding identifier;

cell generation means for generating second cells containing the prepared second header and the user information of the first cells;

multiplexing/generation means for multiplexing the generated second cells so as to have a fixed length, thereby generating third cells, and send means for sending the generated third cells to other communication apparatus through a virtual channel.

According to the second feature of the invention, a communication apparatus comprises;

separation means for separating third cells sent from other communication apparatus through a virtual channel;

extraction means for extracting an identifier contained in a second header of second cells obtained by the separation of the third cells:

generation means which, based on the extracted identifier, refers to a conversion table to generate a first header containing corresponding virtual path identifier and virtual channel identifier; and output means for sending first cells containing the generated first header to a terminal.

According to the third feature of the invention, a communication system comprises:

a plurality of terminals;

an exchange for mutual relay of the plurality of terminals; and the communication apparatus according to the first or second feature of the invention.

That is, according to the invention, a plurality of virtual channels are multiplexed within one virtual channel to reduce the number of virtual channels.

BRIEF DESCRIPTION OF THE DRAWINGS

The invention will be explained in more detail in conjunction with the appended drawings, wherein:

FIGS. 6A and 6B are diagrams showing the construction of a first cell header and a second cell header, respectively according to a second preferred embodiment of the invention.

DESCRIPTION OF THE PREFERRED EMBODIMENTS

Preferred embodiments of the invention will be explained in conjunction with the accompanying drawings.

First Preferred Embodiment

Figure 1:
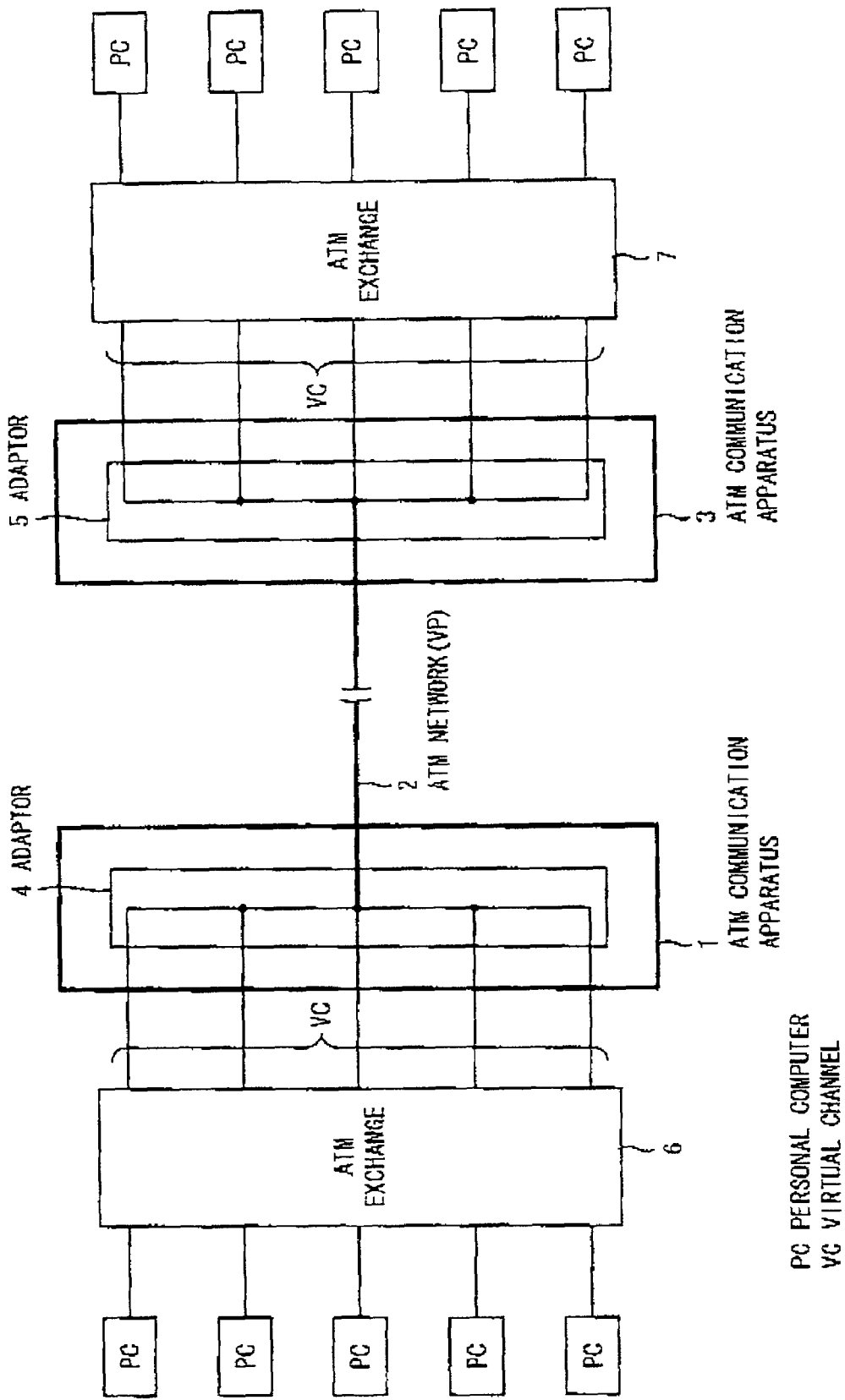
FIG. 1 is a conceptual diagram showing the construction of a conventional ATM communication system.
Figure 2:
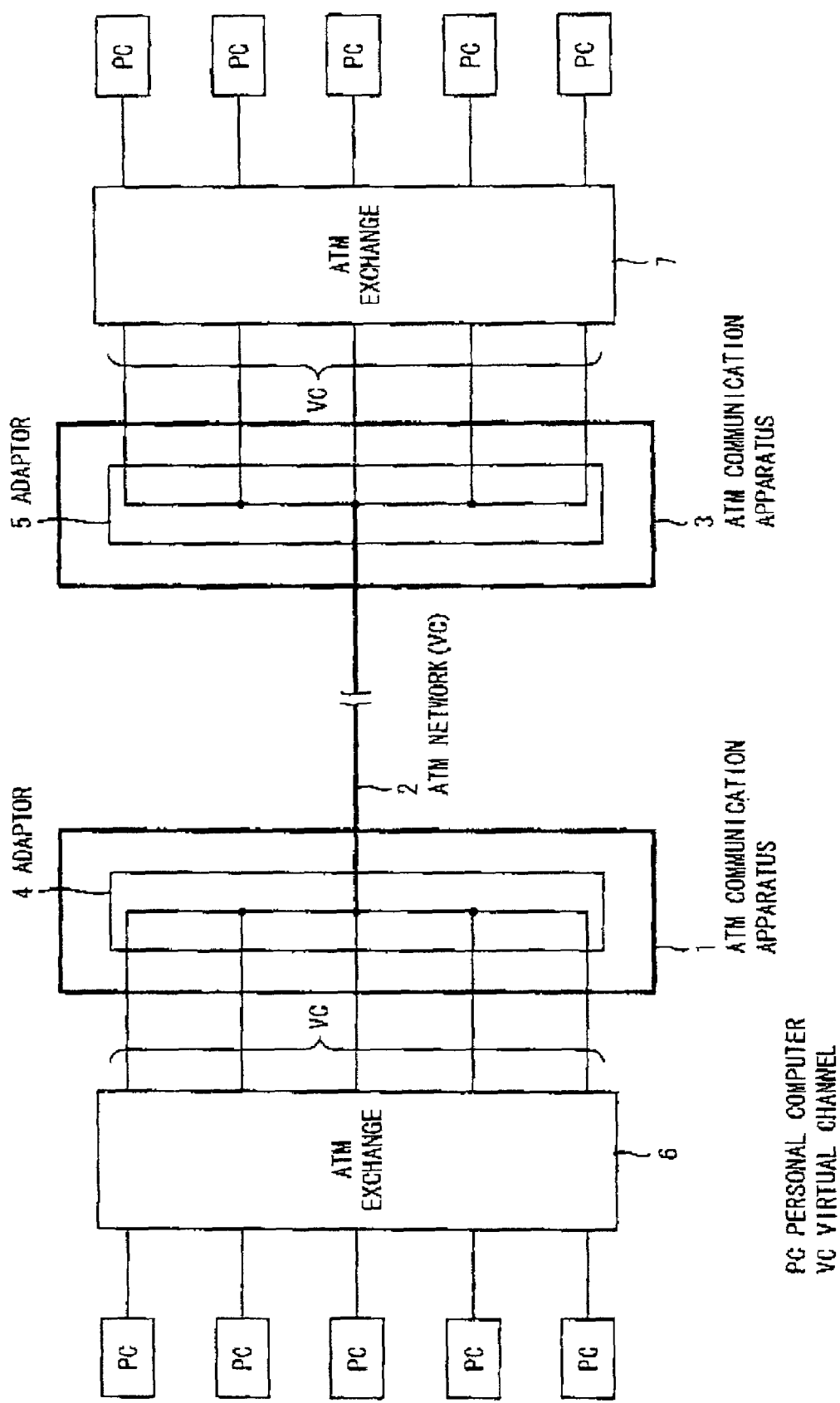
FIG. 2 is a conceptual diagram showing the construction of an ATM communication system according to a first preferred embodiment of the invention.

FIG. 2 is a conceptual diagram showing the construction of an ATM communication system according to a first preferred embodiment of the invention. The ATM communication system shown in FIG. 2 comprises: a plurality of terminals, such as personal computers; ATM communication apparatuses 1, 3 provided respectively with adaptors 4, 5 for ATM cells (hereinafter referred to as "cells") multiplexing or demultiplexing; ATM exchanges 6, 7 for performing switching between the plurality of terminals and the ATM communication apparatuses 1, 3; and an ATM network 2 for connecting the ATM communication apparatuses 1, 3 to each other. The arrangement of the ATM communication apparatuses 1, 3 and the ATM exchanges 6, 7 may be reversed.

Figure 3:
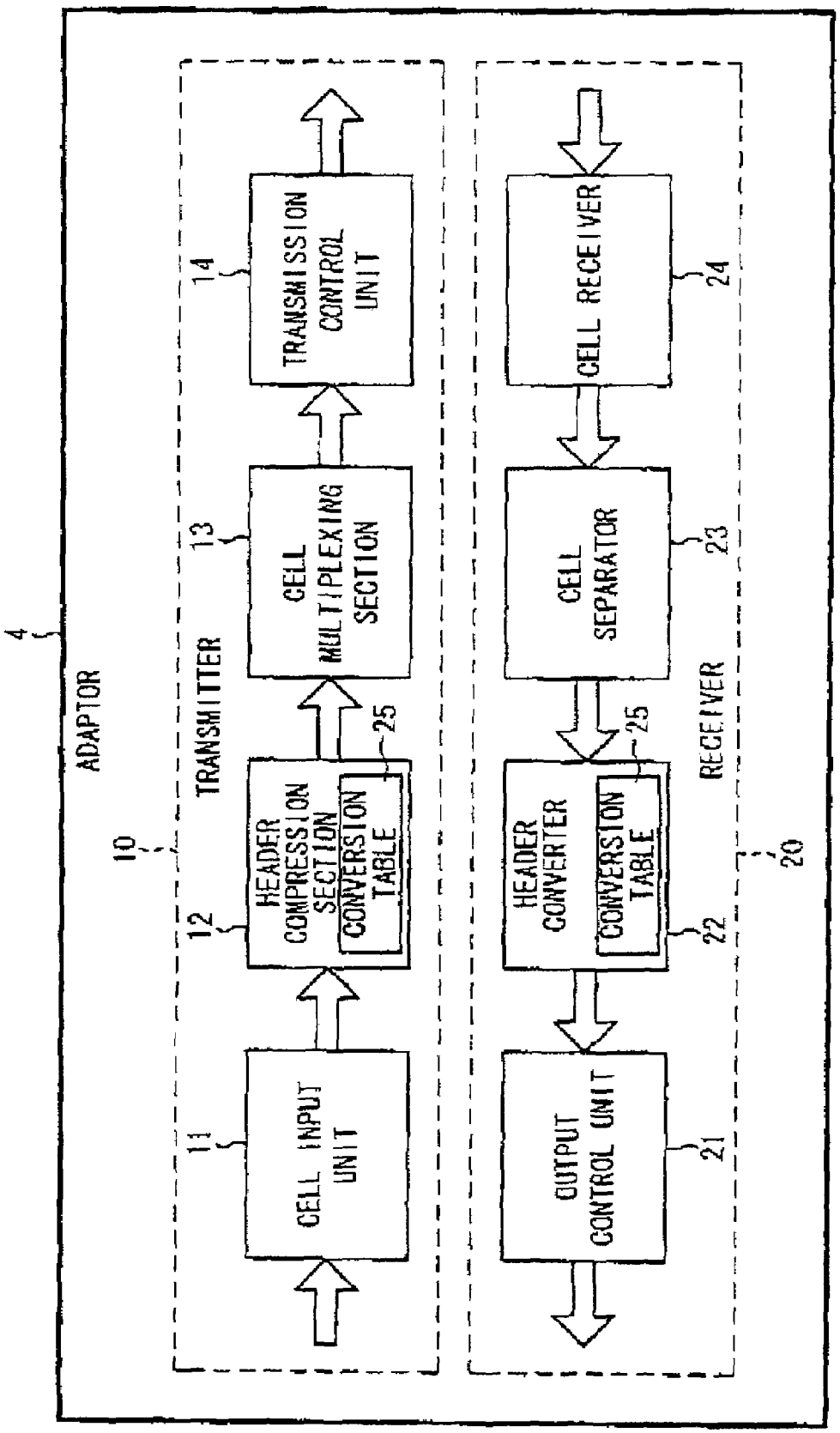
FIG. 3 is a block diagram showing the internal construction of an adaptor shown in FIG. 2.

FIG. 3 is a block diagram showing the internal construction of an adaptor 4. The adaptor 4 comprises: a transmitter 10 which sends cells to the ATM cell communication apparatus 3 according to cycles set for each virtual path (VP) connection or virtual channel (VC) connection; and a cell receiver 20 for receiving cells sent from an ATM cell communication apparatus 3.

The transmitter 10 comprises: a cell input unit 11 for permitting the input of 53-byte cells (hereinafter referred to as "first cells") output from each terminal; a header compression section 12 for preparing a second header such that the virtual path identifier and the virtual channel identifier contained in the first cell header have been compressed; a cell multiplexer 13 which successively separates, for example, 49-byte cells containing the second header and the user information of the first cell (hereinafter referred to as "second cells"), for example, into 47 bytes portions, and performs multiplexing to prepare 53-byte cells (hereinafter referred to as "third cells") comprising the separated portion and a header, comprising the header information stored in the first cell header and a pointer information described below; and a send control unit 14 for controlling the send timing of the third cells.

The receiver 20 comprises: a cell receiver 24 for receiving the third cells sent from the ATM cell communication apparatus 3; a cell separator 23 for separating the multiplexed third cells to change the third cells to the second cells; a cell converter 22 which generates, based on the identifiers contained in the second header of the second cells, the first header containing the corresponding virtual path identifier and virtual channel identifier to convert the second cells to the first cells; and an output control unit 21 for controlling the timing of send of the converted first cells to the send destination terminal.

Further, the header compression section 12 and the cell Converter 22 have a common conversion table 25. As will be explained in conjunction with FIG. 4, a virtual path identifier 31, a virtual channel identifier 32, and an identifier 41 attached to the second cells are stored in an associated state in the common conversion table 25. In this preferred embodiment, the construction of the adaptor 5 is the same as that of the adaptor shown in FIG. 3.

Further, here, in the header compression section 12, the virtual path identifier and the virtual channel identifier in the first cells are extracted, and reference is made to the conversion table 25 to prepare a second header such that the virtual path identifier and the virtual channel identifier have been compressed, followed by the generation of second cells containing the second header and the user information of the first cells. The second cells are multiplexed in the cell multiplexer 13 to generate third cells.

Figure 4B:
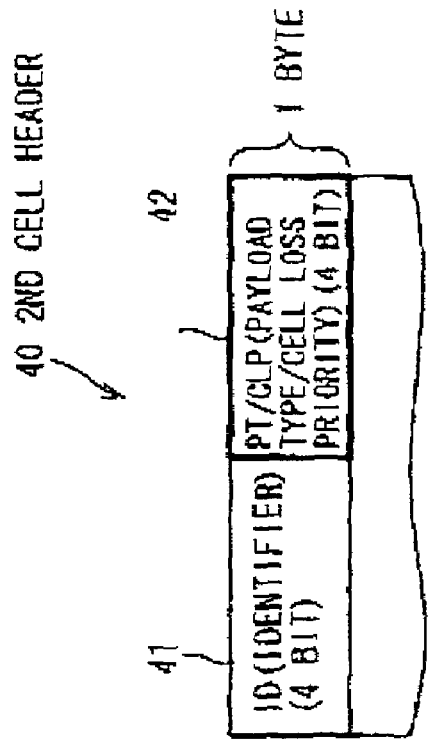
FIGS. 4A and 4B are diagrams showing the construction of each header of first and second cells, respectively.
Figure 4A:
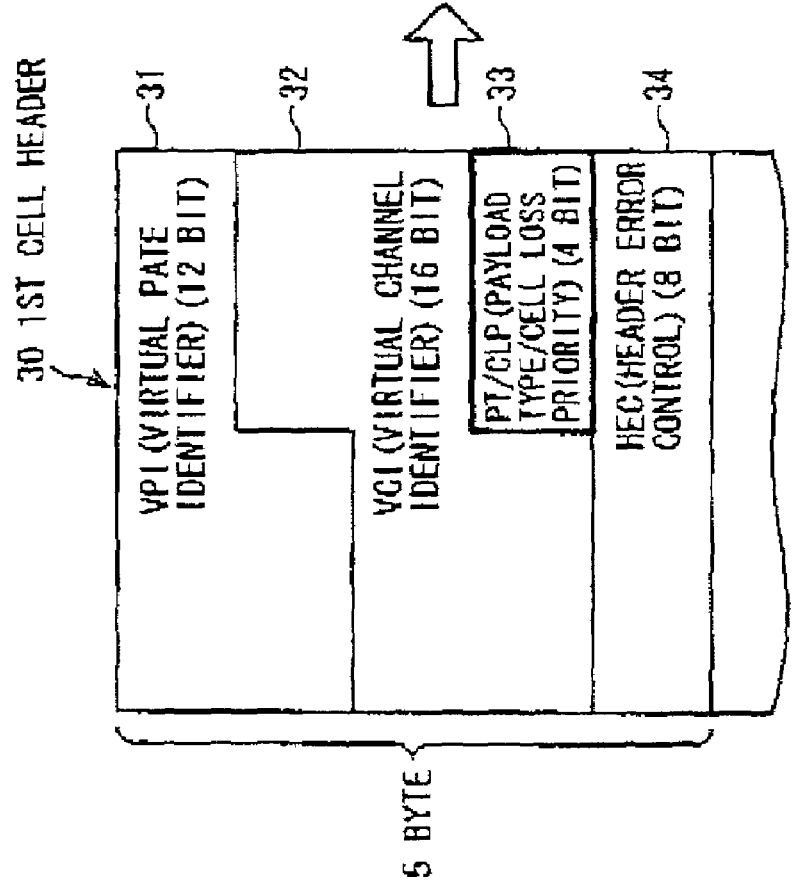

FIGS. 4A and 4B are diagrams showing the construction of each header in the first and second cells, respectively. The header compression section 12 prepares a second header of the second cells as shown in FIG. 4B, based on the virtual path identifier (VPI) 31 and the virtual channel identifier (VCI) 32 in the first cell header as shown in FIG. 4A. FIGS. 4A and 4B illustrate headers for an NNI (network node interface) cell.

FIG. 4A illustrates payload type/cell loss priority (PT/CLP) 33 and header error control (HEC) 34, in addition to the virtual path identifier 31 and the virtual channel identifier 32. The field of the virtual path identifier 31 is 12 bits, the field of the virtual channel identifier 32 is 16 bits, the field of the payload type/cell loss priority 33 is 4 bits, and the field of the header error control 34 is 8 bits.

FIG. 4B shows the identifier (ID) 41 and the payload type/cell loss priority 33. The field of the identifier 41 is 4 bits, and the field of the payload type/cell loss priority 33 is 4 bits. Since the identifier 41 is 4 bits and the payload type/cell loss priority 33 is 4 bits, the header of the second cells is 1 byte. Further, since the identifier 41 is 4 bits, the number of virtual channels may be brought to 16 at the largest.

Figure 5A:
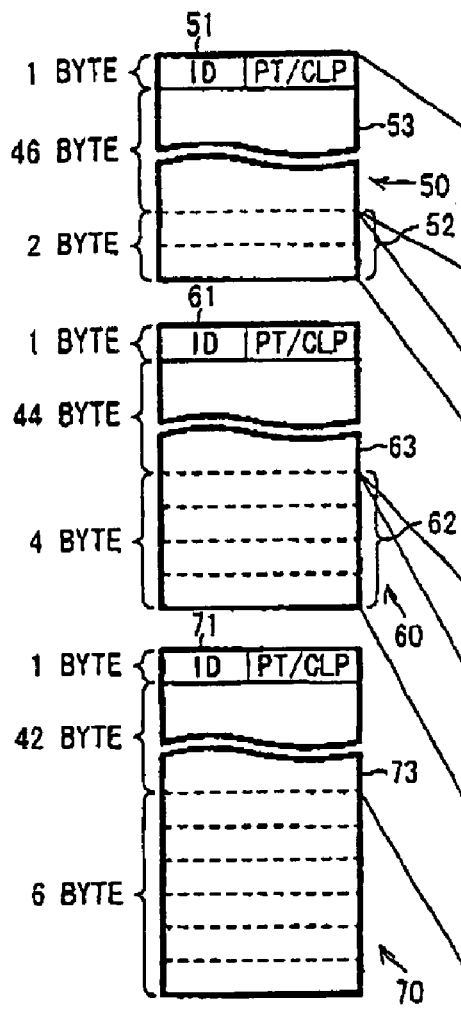
FIGS. 5A and 5B are diagrams showing the construction of second and third cells, respectively.
Figure 5B:
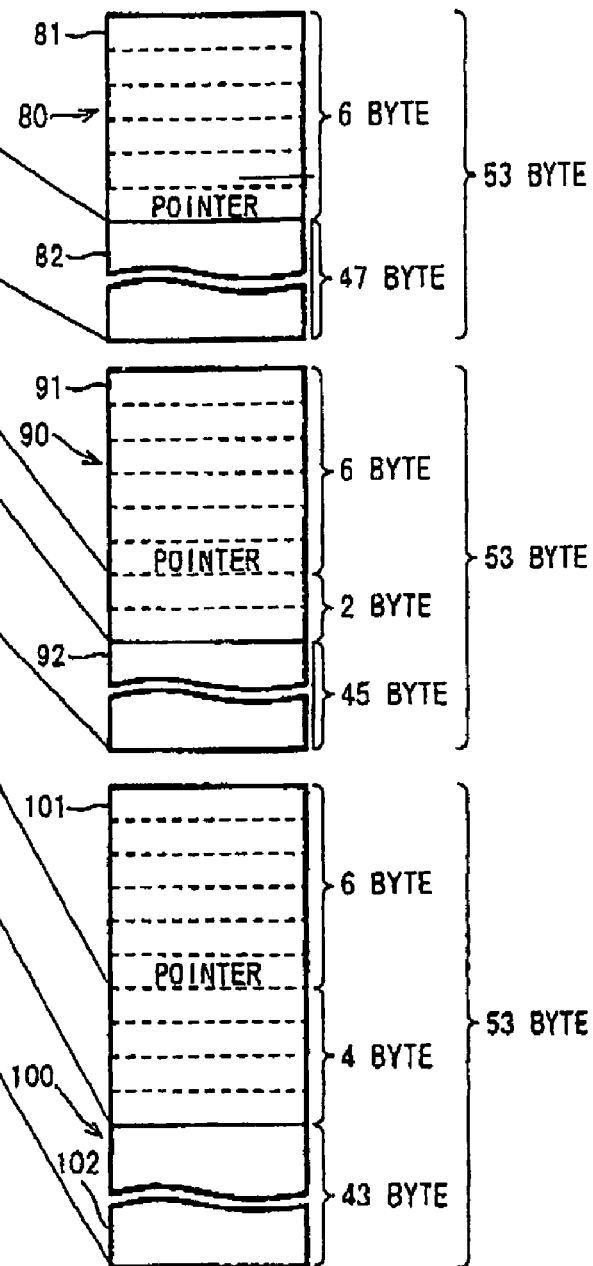

FIGS. 5A and 5B are diagrams showing the construction of the second and third cells, respectively. The cell multiplexer 13 separates each second cell as show in FIG. 5A so as to be stored in the payload in each third cell as show in FIG. 5B, followed by multiplexing to prepare third cells.

The second cells 50, 60, 70 comprise headers 51, 61, 71 and user information 53, 63, 73 of the first cells shown in FIG. 5A. The third cells 80, 90, 100 comprise headers 81, 91, 101, comprising the header and the pointer shown in FIG. 5A, and payloads 82, 92. 102 comprising multiplexed second cells shown in FIG. 5A.

The second cells 50, 60, 70 each are 49 bytes, and are composed of 1 byte of the headers 51, 61, 71 and 48 bytes of the user information 53, 63, 73. On the other hand, the third cells 80, 90, 100 each are 53 bytes, and are composed of 6 bytes of the headers 81, 91, 101 and 47 bytes of the payloads 82, 92, 102.

In the third cells 80, 90, 100, PT/CLP is contained in both the headers 81, 91, 101 and the payloads 82, 92, 102. However, it should be noted that PT/CLP contained in the headers 81, 91, 101 is inherently allocated to the third cells 80, 90, 100 while PT/CLP contained in the payloads 82, 92, 102 is inherently allocated to the second cells 50, 60, 70. That is, PT/CLP contained in the headers 81, 91, 101 is different from PT/CLP contained in the payloads 82, 92, 102 in this respect.

In the cell multiplexer 13, the second cell as shown in FIG. 5A is converted to the third cell as shown in FIG. 5B. This is because the cell format of cells, which are actually sent through the ATM network 2, should be brought to 53 bytes. That is, according to this preferred embodiment, since 6 bytes out of 53 bytes at the time of send is used for storage of header information, the user information should be 47 bytes.

On the other hand, since the second cell is 49 bytes, only 47 bytes out of 49 bytes can be stored in the payload in the third cell. Accordingly, in the cell multiplexer 13, multiplexing is performed so that 49-byte cells are converted to 53-byte cells.

Next, the operation of the ATM communication system shown in FIG. 2 will be explained by taking, as an example, the case where cells are sent from the ATM cell communication apparatus 1 to the ATM cell communication apparatus 3.

At the outset, 53-byte first cells are output from any one of the terminals, connected to the ATM cell communication apparatus 1, and sent to the ATM cell communication apparatus 1. Upon the send of the 53-byte first cells, on the ATM cell communication apparatus 1 side, the first cells are input into the cell input unit 11 of the transmitter 10 in the adaptor 4. The input first cells are sent to the header compression section 12.

Based on the virtual path identifier 31 and the virtual channel identifier 32, the header compression section 12 refers to the conversion table 25, and prepares second cell headers having an identifier 41 such that the first cell headers have been compressed. The second cells comprising the prepared header and the first cell user information are sent to the cell multiplexer 13. In the cell multiplexer 13, as shown in FIGS. 5A and 5B, the received second cells are multiplexed to prepare third cells.

More specifically, in the cell multiplexer 13, the whole data in the input second cell 50 except for the 48th- and 49th-byte data 52 is stored in the payload 82 of the third cell 80. Next, the remaining data 52 in the second cell 50 is stored in the payload 92 of the third cell 90. Further, the whole data in the second cell 60 except for the 45th- to 49th-byte data 62 is stored in the payload 92. According to the above procedure, the third cells are prepared from the second cells.

Most of the third cells provided according to the above procedure each contain data associated with two second cells. Further, as will be explained later, the third cells are separated in the ATM cell communication apparatus 3 on the receiver side, followed by the preparation of second cells. In order to facilitate the preparation of the second cells on the ATM cell communication apparatus 3 side, one byte in the third cell header is used as a pointer to store information indicating which site, for example, in the payload 92 is the boundary between data associated with the two second cells.

For example, in the third cell 90, the 2nd byte and the 3rd byte are the boundary between data of the second cell 50 and data of the second cell 60, and, in the third cell 100, the 4th byte and the 5th byte are the boundary between data of the second cell 60 and data of the second cell 70. Therefore, when this is stored in the pointer, the second cells can be prepared in a short time from the third cells by reference to the pointer on the ATM cell communication apparatus 3 side.

Subsequently, the third cells prepared in the cell multiplexer 13 are sent to the send control unit 14. The send control unit 14 sends the received third cells to the ATM cell communication apparatus 3 through the ATM network 2 at timing according to the contract rate for each VC connection.

On the ATM cell communication apparatus 3 side, each of the sent third cells is received by the cell receiver 24 in the receiver 20 of the adaptor 5. Each third cell received by the cell receiver 24 is sent to the cell separator 23. Based on the information stored in the pointer in each of the output third cells, the cell separator 23 separates data stored in the payload to prepare second cells which are then sent to the header converter 22. The third cell header is discarded in the cell separator 23.

Based on the header identifier 41 of the second cells, the header converter 22 refers to the conversion table 25 to prepare first cells which are provided with headers containing the virtual path identifier 31 and the virtual channel identifier 32. The first cells are then sent to the output control unit 21. The output control unit 21 sends the first cells to the terminal according to output timing.

When the identifier 41 corresponding to the virtual path identifier 31 and the virtual channel identifier 32 is not stored in the conversion table 25, the first cells are passed in this state through the cell multiplexer 13 and are sent to the send control unit 14 which sends the cells to the ATM cell communication apparatus 3 side at predetermined timing.

In the present preferred embodiment, the operation of the ATM cell communication system has been explained by taking, as an example, the case where cells are sent from the ATM cell communication apparatus 1 to the ATM cell communication apparatus 3. However, this is true of the case where cells are sent from the ATM cell communication apparatus 3 to the ATM cell communication apparatus 1.

Second Preferred Embodiment

FIG. 6 is a diagram showing the construction of the first cell header and the second cell header according to the second preferred embodiment of the invention. As shown in FIG. 6, according to this preferred embodiment, the second cell identifier 41 is 12 bits from the viewpoint of further increasing the number of virtual channels. More specifically, when the second cell identifier 41 is 12 bits, the number of virtual channels can be brought to 4096 at the largest. In this connection, it should be noted that the number of bits in the second cell identifier is not limited to 12 bits adopted in the second cell identifier 41 according to this preferred embodiment.

The above preferred embodiments according to the invention have been explained by taking the ATM cell communication system as an example. In addition to the ATM cells, also in systems where cells of a predetermined number of bytes are used in the communication, the adoption of the same method as explained in the above preferred embodiments can realize data communication through a reduced number of lines.

As is apparent from the foregoing description, according to the invention, second headers for storing identifiers corresponding to the virtual path identifier and the virtual channel identifier stored in each first header of first cells are generated, and second cells comprising the second header storing the identifier and the user information of the first cells are generated, followed by multiplexing of the second cells so as to have a fixed length, thereby preparing third cells which are then sent to other communication apparatus. This constitution can realize data communication through a reduced number of lines, and thus can reduce, for example, usage charge of the ATM lines.

The invention has been described in detail with particular reference to preferred embodiments, but it will be understood that variations and modifications can be effected within the scope of the invention as set forth in the appended claims.

What is claimed is:

1. A communication apparatus comprising:

first extraction means for extracting a virtual path identifier and a virtual channel identifier stored in a first output header of first cells output from a terminal;

preparation means which, based on the extracted virtual path identifier and virtual channel identifier, refers to a conversion table to prepare a second output header containing a corresponding identifier, wherein the second output header is compressed relative to the first output header;

cell generation means for generating second cells containing the prepared second output header and a user information of the first cells;

multiplexing/generation means for multiplexing the generated second cells so as to have a fixed length, thereby generating third cells;

send means for sending the generated third cells to other communication apparatus through a virtual channel;

separation means for separating third cells sent from said other communication apparatus through a virtual channel;

second extraction means for extracting an identifier contained in a second input header of second cells obtained by the separation of the third cells, one byte of a third cell header being used as a pointer indicating a boundary between data associated with two of said second cells;

generation means which, based on the extracted identifier, refers to said conversion table to generate a first input header containing corresponding virtual path identifier and virtual channel identifier, wherein said first input header is expanded relative to said second input header; and output means for sending first cells containing the generated first input header to a terminal.

2. The communication apparatus according to claim 1, wherein the third cells are asynchronous transfer mode cells.

3. The communication apparatus according to claim 1, wherein a minimum unit of information of the identifier is changeable.

4. A communication system comprising:

a plurality of terminals;

an exchange for mutual relay of the plurality of terminals; and the communication apparatus according to claim 1.

5. The communication system according to claim 4, wherein the communication apparatus is provided within the exchange.

* * * * *